United States Patent
Kalb

(10) Patent No.: US 6,437,560 B1
(45) Date of Patent: Aug. 20, 2002

(54) COMBINED SUCTION CUP AND ISOLATED SENSOR

(75) Inventor: James R. Kalb, Petersburg, MI (US)

(73) Assignee: Syron Engineering & Manufacturing, LLC, Saline, MI (US)

( * ) Notice: Subject to any disclaimer, the term of this patent is extended or adjusted under 35 U.S.C. 154(b) by 0 days.

(21) Appl. No.: 09/703,106

(22) Filed: Oct. 31, 2000

(51) Int. Cl.[7] .............. G01B 7/14; G01B 21/16; B25B 11/00; F16B 47/00; B25J 15/06
(52) U.S. Cl. .............. 324/207.13; 324/207.26; 324/226; 324/261; 73/866.5; 248/363; 269/21; 414/752.1
(58) Field of Search ............ 324/207.11, 207.13, 324/207.26, 226, 229–231, 261, 262; 248/363; 269/21; 279/3; 294/64.1; 73/866.5; 414/752.1; 901/35, 40, 46; 307/116, 117

(56) References Cited

U.S. PATENT DOCUMENTS

| 3,033,298 A | * | 5/1962 | Johnson .................. 248/363 X |
| 4,662,668 A | * | 5/1987 | Hufford .................. 294/64.1 |
| 4,779,352 A | * | 10/1988 | Lang ...................... 324/229 X |
| 4,906,926 A | * | 3/1990 | Rogacki et al. ........... 901/46 X |
| 5,345,935 A | * | 9/1994 | Hirsch et al. |
| 5,427,363 A | * | 6/1995 | Rink et al. .................. 269/21 |
| 5,497,771 A | * | 3/1996 | Rosenheimer |
| 5,631,426 A | * | 5/1997 | Jao |

* cited by examiner

Primary Examiner—Gerard R. Strecker
(74) Attorney, Agent, or Firm—Carlson, Gaskey & Olds

(57) ABSTRACT

A combined vacuum cup and sensor is utilized to lift parts. The vacuum cup defines a vacuum chamber between radially inner and outer lips. The sensor is mounted radially inwardly of the inner lip, but is isolated from the vacuum chamber. In this way, parts that are difficult for a larger cup to lift can be lifted easily. Moreover, the sensor need not be provided with a fluid tight seal.

9 Claims, 1 Drawing Sheet

COMBINED SUCTION CUP AND ISOLATED SENSOR

BACKGROUND OF THE INVENTION

This invention relates to a suction cup having a proximity sensor which is isolated from the vacuum chamber in a part handling tool.

Suction cups are utilized in many applications for moving parts in a factory setting. A suction cup communicates with a source of vacuum to provide a lifting force for lifting a part. As an example, suction cups are utilized with moving tools for grabbing and then moving sheet materials.

One challenge in the use of suction cups in such settings is insuring that a part has been lifted and is being moved. It is thus desirable to incorporate a sensor for sensing the presence of a part adjacent to the cup. Cups have been proposed wherein a vacuum chamber surrounds a sensor which is in the vacuum cup. These systems have some deficiencies in that it would be desirable to isolate the sensor from the vacuum chamber for a number of reasons. One reason is that with the sensor in the vacuum cup, the sealing of the sensor mount must be precise and fluid tight. Otherwise, the vacuum could be broken. Moreover, with such systems the vacuum cup is relatively large as is the vacuum chamber. This requires a solid surface on the part to be lifted.

SUMMARY OF THE INVENTION

In the disclosed embodiment of this invention, a vacuum cup is utilized which has radially inner and outer lips to define a vacuum chamber. A sensor is mounted interior to the radially inner lip of the cup. The inner lip isolates the sensor from the vacuum chamber.

Thus, the sensor need not have a fluid tight seal. Moreover, the vacuum cup is relatively small, and thus holes or openings within the part to be lifted will not break the vacuum cup.

In a preferred embodiment the inner and outer lips of the cup extend for approximately equal distances from a mount portion.

These and other features of the present invention can be best understood from the following specification and drawings, the following of which is a brief description.

DETAILED DESCRIPTION OF A PREFERRED EMBODIMENT

Figure 1:
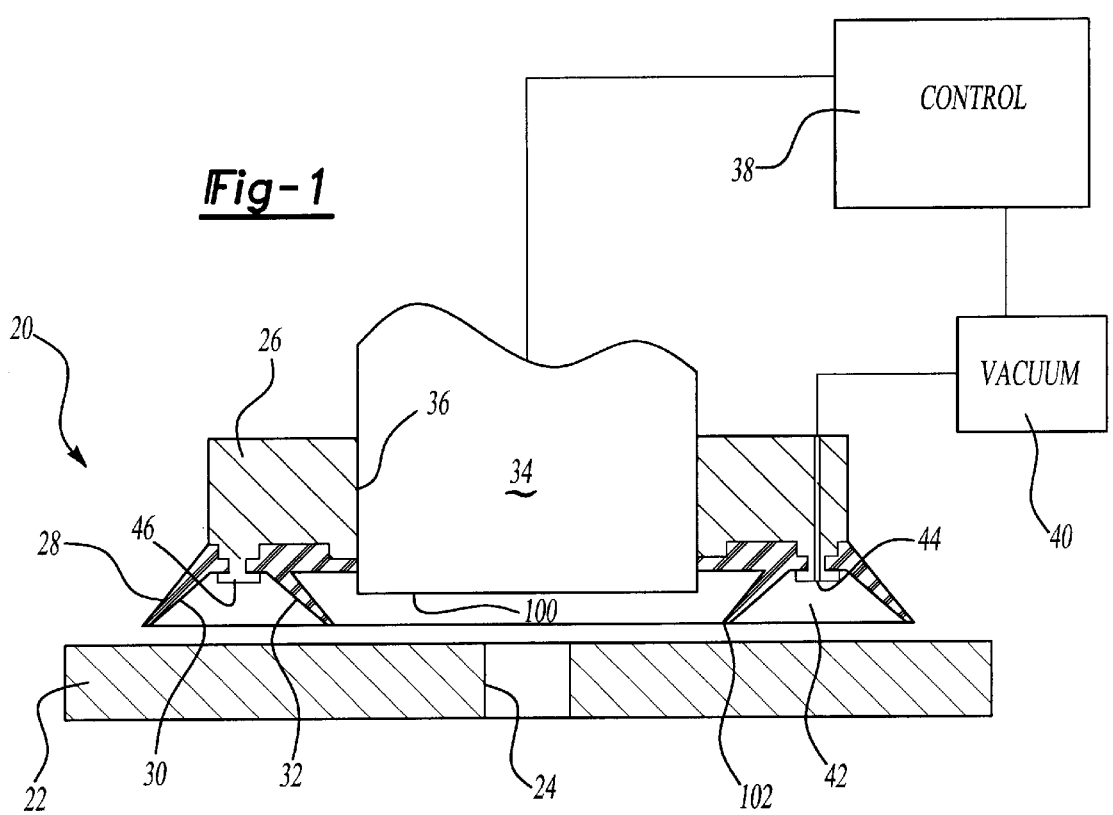
FIG. 1 is a cross-sectional view through a vacuum cup and sensor combination.

As shown in FIG. 1, a combined vacuum cup and sensor 20 is utilized for lifting parts such as a sheet part 22. As is known, sheet parts 22 are often formed with apertures such as an aperture 24. The present invention facilitates the lifting of a part 22 having such an aperture 24.

As shown, a mount block 26 mounts a vacuum cup 28 having a radially outer lip 30 and a radially inner lip 32. As can be seen, the lips extend for approximately the same distance from the mount 26 and at angles outwardly in respective radially outer and inward directions.

A sensor 34 is mounted within a bore 36 within the block 26. The sensor communicates with a control 38. The control 38 may also control a source of vacuum 40 to apply a vacuum to a vacuum chamber 42 defined between the lips 30 and 32. Notably, the sensor is spaced from the axially outermost end 102 of the lips, and there is a chamber 100 spaced inwardly of the inner lip 32 and forwardly at the sensor axially outermost end.

The present invention thus provides a sensor 34 which is isolated from the vacuum chamber 42. This allows the mounting of the sensor 34 within the bore 36 with no need for a fluid tight mount. Moreover, since the vacuum chamber 42 is isolated with a central area associated with the detecting end 36 of the sensor 34, an aperture such as aperture 24 will not break the vacuum. Thus, the arrangement 20 can lift the part 22 by simply positioning the chamber 42 such that it does not cover the aperture 24.

Figure 2:
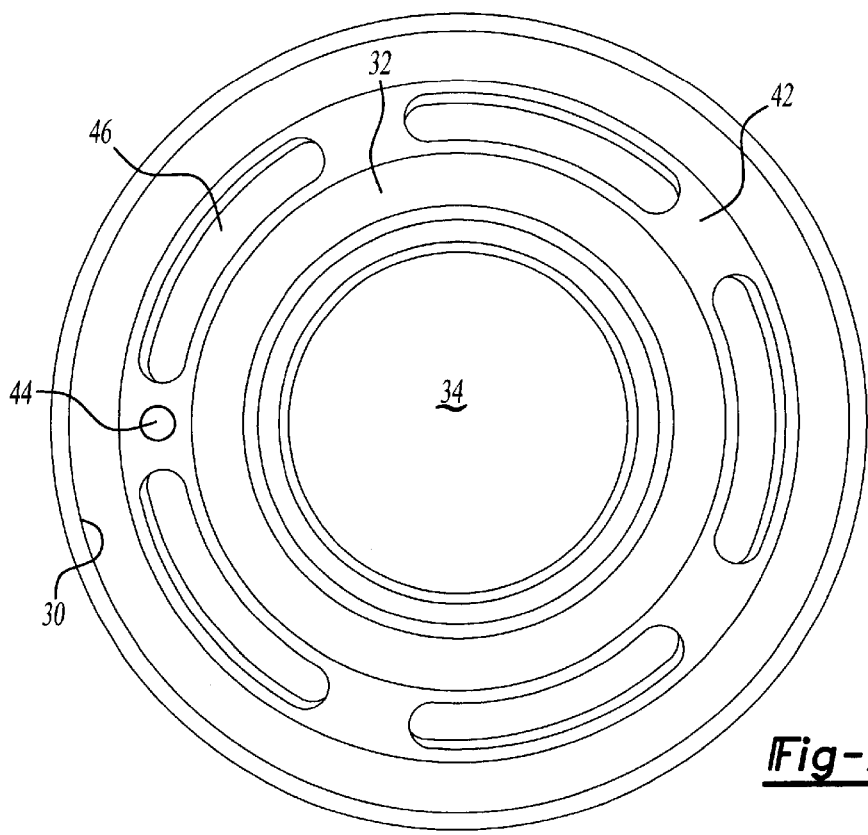
FIG. 2 is an end view of the cup of FIG. 1.

As shown in FIG. 2, port 44 communicates with the source of vacuum 40 such that a vacuum is applied within the vacuum chamber 42. Again, the sensor 34 is not mounted within the vacuum chamber 42. Stops 46 provide a stop for compression of the cup against the part. As known, typically, the cup is moved into contact with the part or sheet 22 and compressed to create a fluid tight seal through lips 30 and 32.

The proximity sensor may be any type of sensor, but is preferably a magnetic proximity sensor, and most preferably a sensor available from Syron Engineering of Saline, Mich.

Although a preferred embodiment of this invention has been disclosed, a worker in this art would recognize that modifications would come within the scope of this invention. For that reason the following claims should be studied to determine the true scope and content of this invention.

What is claimed is:

1. A vacuum cup and sensor combination comprising:

a vacuum cup mounted to a mount block, said vacuum cup having a radially inner lip and a radially outer lip with a vacuum chamber defined between said radially inner and outer lips;

a proximity sensor mounted to said block at a location radially inward of said inner lip such that said sensor is isolated from said vacuum chamber; and said inner lip extends at an angle axially outwardly from said mount and radially inwardly and said outer lip extends at an angle radially outwardly from said mount.

2. A combined vacuum cup and sensor as set forth in claim 1, wherein said sensor is centered on a central axis of said inner lip.

3. A combined vacuum cup and sensor as set forth in claim 1, wherein said cup is generally cylindrical.

4. A combined vacuum cup and sensor as set forth in claim /5, wherein said inner lip extends at an angle axially outwardly from said mount and radially inwardly and said outer lip extends at an angle radially outwardly from said mount.

5. A vacuum cup and sensor combination comprising:

a vacuum cup mounted to a mount block, said vacuum cup having a radially inner lip and a radially outer lip with a vacuum chamber defined between said radially inner and outer lips;

a proximity sensor mounted to said block at a location radially inward of said inner lip such that said sensor is isolated from said vacuum chamber;

said inner and outer lip extend from said mount for an approximately equal distance.

6. A vacuum cup and sensor combination comprising:

a vacuum cup mounted to a mount block, said vacuum cup having a radially inner lip and a radially outer lip with a vacuum chamber defined between said radially inner and outer lips, said radially inner lip extending axially away from said mount and at an angle extending radially inward toward the central axis of said inner lip, and said outer lip extending radially outward from said axis, said inner and outer lips being generally circular and centered on said axis; and a magnetic proximity sensor mounted to said block at a location radially inward of said lip such that said sensor is isolated from said vacuum chamber, said sensor being mounted in a bore which is centered on said axis, said magnetic proximity sensor being spaced from an axially outermost end of said inner lip, and a chamber being defined inwardly of said inner lip such that a portion of said chamber is between said sensor and a part to be lifted.

7. A combined vacuum cup and sensor as set forth in claim 1, wherein said vacuum chamber is utilized to lift a part, and said proximity sensor is utilized to sense the presence of a part.

8. A combined vacuum cup and sensor as set forth in claim 1, wherein said proximity sensor is a magnetic proximity sensor.

9. A combined vacuum cup and sensor as set forth in claim 6, wherein said vacuum chamber is utilized to lift a part, and said proximity sensor is utilized to sense the presence of a part.

* * * * *